United States Patent
Ashok et al.

(10) Patent No.: US 8,930,543 B2
(45) Date of Patent: * Jan. 6, 2015

(54) DYNAMICALLY BUILDING A SET OF COMPUTE NODES TO HOST THE USER'S WORKLOAD

(71) Applicant: International Business Machines Corporation, Armonk, NY (US)

(72) Inventors: Rohith K. Ashok, Apex, NC (US); Roy F. Brabson, Raleigh, NC (US); Hugh E. Hockett, Raleigh, NC (US); Matt R. Hogstrom, Cary, NC (US); Wolfgang Segmuller, Valhalla, NY (US); Matthew J. Sheard, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,849

(22) Filed: Apr. 8, 2013

(65) Prior Publication Data

US 2013/0227131 A1 Aug. 29, 2013

Related U.S. Application Data

(63) Continuation of application No. 13/356,427, filed on Jan. 23, 2012.

(51) Int. Cl.
  *G06F 15/173* (2006.01)
  *G06F 9/50* (2006.01)
  *H04L 29/08* (2006.01)

(52) U.S. Cl.
  CPC .......... *H04L 67/1031* (2013.01); *G06F 9/5072* (2013.01)
  USPC ........... 709/226; 709/224; 709/223; 718/104; 718/105

(58) Field of Classification Search
  CPC . G06F 9/50–9/5094; G06F 9/45533–9/45558; G06F 9/55; G06F 9/5077; G06F 9/203; G06F 9/2033; G06F 2201/815; H04L 29/08144–29/08297; H04L 29/08549; H04L 67/1002–67/1038; H04L 67/1097
  USPC ................... 709/223, 224, 226; 718/104–105
  See application file for complete search history.

(56) References Cited

U.S. PATENT DOCUMENTS 8,140,817 B2 3/2012 Schopp et al.
8,478,845 B2 7/2013 Agarwala et al.
(Continued)

FOREIGN PATENT DOCUMENTS

WO 2011159842 A2 12/2011

OTHER PUBLICATIONS

Office Action for U.S. Appl. No. 13/356,427 dated Mar. 19, 2014, pp. 1-21.
(Continued)

*Primary Examiner* — Alina N Boutah
(74) *Attorney, Agent, or Firm* — Robert A. Voigt, Jr.; Winstead, P.C.

(57) ABSTRACT

A method, system and computer program product for dynamically building a set of compute nodes to host a user's workload. An administrative server receives workload definitions that include the types of workloads that are to be run in a cloud group as well as a number of instances of each workload the cloud group should support. These workload definitions are used to determine the virtual machine demands that the cloud group will place on the cloud environment. The administrative server further receives the demand constraints, placement constraints and license enforcement policies. The administrative server identifies a set of compute nodes to host the user's workload based on the virtual machines demands, the demand constraints, the placement constraints and the license enforcement policies. In this manner, a set of compute nodes is dynamically built for consideration in forming a cloud group without the user requiring knowledge of the cloud's composition.

8 Claims, 8 Drawing Sheets

(56) References Cited

U.S. PATENT DOCUMENTS

| | | |
|---|---|---|
| 8,489,812 B2 | 7/2013 | Chavda et al. |
| 8,612,785 B2 | 12/2013 | Brown et al. |
| 8,620,851 B2 * | 12/2013 | Brown et al. ............ 706/52 |
| 8,627,123 B2 | 1/2014 | Jain et al. |
| 8,639,791 B2 | 1/2014 | Carter et al. |
| 8,656,019 B2 | 2/2014 | Chikando et al. |
| 2006/0136913 A1 | 6/2006 | Sameske |
| 2008/0244600 A1 | 10/2008 | Wong et al. |
| 2008/0295096 A1 | 11/2008 | Beaty et al. |
| 2009/0070771 A1 | 3/2009 | Yuyitung et al. |
| 2009/0228589 A1 | 9/2009 | Korupolu |
| 2010/0125473 A1 | 5/2010 | Tung et al. |
| 2010/0332658 A1 | 12/2010 | Elyashev |
| 2011/0016214 A1 | 1/2011 | Jackson |
| 2011/0029672 A1 | 2/2011 | Agneeswaran |
| 2011/0072293 A1 | 3/2011 | Mazzaferri et al. |
| 2011/0106516 A1 | 5/2011 | Friedlander et al. |
| 2011/0126197 A1 | 5/2011 | Larsen et al. |
| 2011/0126207 A1 | 5/2011 | Wipfel et al. |
| 2011/0126275 A1 | 5/2011 | Anderson et al. |
| 2011/0131335 A1 | 6/2011 | Spaltro et al. |
| 2011/0138034 A1 | 6/2011 | Brookbanks et al. |
| 2011/0161470 A1 | 6/2011 | Baskaran et al. |
| 2011/0213719 A1 * | 9/2011 | Ferris et al. ............ 705/310 |
| 2011/0214005 A1 | 9/2011 | Biran et al. |
| 2011/0231899 A1 | 9/2011 | Pulier et al. |
| 2011/0239010 A1 | 9/2011 | Jain et al. |
| 2011/0246992 A1 | 10/2011 | Kern |
| 2011/0264748 A1 | 10/2011 | Pouzin et al. |
| 2011/0270968 A1 | 11/2011 | Salsburg et al. |
| 2011/0276686 A1 | 11/2011 | Tung et al. |
| 2011/0314466 A1 | 12/2011 | Berg et al. |
| 2011/0320606 A1 | 12/2011 | Madduri et al. |
| 2012/0023372 A1 | 1/2012 | Lin et al. |
| 2012/0042055 A1 | 2/2012 | Agarwala et al. |
| 2012/0066487 A1 | 3/2012 | Brown et al. |
| 2012/0079089 A1 | 3/2012 | Lin et al. |
| 2012/0079493 A1 | 3/2012 | Friedlander et al. |
| 2012/0110260 A1 | 5/2012 | Chavda et al. |
| 2012/0117242 A1 | 5/2012 | Aoki et al. |
| 2012/0130936 A1 | 5/2012 | Brown et al. |
| 2012/0131591 A1 | 5/2012 | Moorthi et al. |
| 2012/0131594 A1 | 5/2012 | Morgan |
| 2012/0137002 A1 | 5/2012 | Ferris et al. |
| 2012/0173728 A1 | 7/2012 | Haskins et al. |
| 2012/0185913 A1 | 7/2012 | Martinez et al. |
| 2012/0204169 A1 * | 8/2012 | Breiter et al. ............ 717/171 |
| 2012/0272249 A1 * | 10/2012 | Beaty et al. ............ 719/318 |
| 2012/0278094 A1 | 11/2012 | Kovacevic et al. |
| 2012/0284408 A1 | 11/2012 | Dutta et al. |
| 2012/0290725 A1 | 11/2012 | Podila |
| 2012/0290862 A1 | 11/2012 | Brown et al. |
| 2012/0304179 A1 | 11/2012 | Devarakonda et al. |
| 2012/0311154 A1 | 12/2012 | Morgan |
| 2013/0007845 A1 * | 1/2013 | Chang et al. ............ 726/4 |
| 2013/0019013 A1 | 1/2013 | Rice et al. |
| 2013/0024494 A1 | 1/2013 | Guarrieri |
| 2013/0024920 A1 | 1/2013 | Rodriguez |
| 2013/0031546 A1 | 1/2013 | Agarwal et al. |
| 2013/0042003 A1 | 2/2013 | Franco et al. |
| 2013/0042004 A1 | 2/2013 | Boss et al. |
| 2013/0055253 A1 | 2/2013 | Jubran et al. |
| 2013/0061220 A1 | 3/2013 | Gnanasambandam et al. |
| 2013/0080617 A1 | 3/2013 | Driesen et al. |
| 2013/0080642 A1 * | 3/2013 | Adam et al. ............ 709/226 |
| 2013/0111033 A1 | 5/2013 | Mao et al. |
| 2013/0111260 A1 | 5/2013 | Reddy et al. |
| 2013/0111467 A1 | 5/2013 | Sundararaj |
| 2013/0132456 A1 | 5/2013 | Ma |
| 2013/0179941 A1 * | 7/2013 | McGloin et al. ............ 726/3 |
| 2013/0185433 A1 | 7/2013 | Zhu et al. |
| 2013/0185667 A1 | 7/2013 | Harper et al. |
| 2014/0047119 A1 | 2/2014 | Wong et al. |

OTHER PUBLICATIONS

Mell et al., "The NIST Definition of Cloud Computing," Special Publication 800-145, Sep. 2011.

International Search Report for International Application No. PCT/CA2013/050041 dated May 6, 2013, pp. 1-3.

Vecchiola et al., "Aneka: A Software Platform for .NET-based Cloud Computing," http://www.buyya.conn/gridbus/reports/AnekaCloudPlatform2009.pdf, 2009, pp. 1-30.

* cited by examiner

DYNAMICALLY BUILDING A SET OF COMPUTE NODES TO HOST THE USER'S WORKLOAD

CROSS-REFERENCE TO RELATED APPLICATIONS

The present application is a continuation application of pending U.S. patent application Ser. No. 13/356,427, which was filed on Jan. 23, 2012, which is assigned to the assignee of the present invention. The present application claims priority benefits to U.S. patent application Ser. No. 13/356,427.

TECHNICAL FIELD

The present invention relates to cloud computing, and more particularly to dynamically building a set of compute nodes to host a user's workload.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

Users may divide the cloud computing environment into one or more "cloud groups," where each cloud group may include a group of physical compute nodes (e.g., servers in racks in a data center) that contain similar hypervisor capabilities. A hypervisor (also called a virtual machine manager) is one of many virtualization techniques allowing multiple operating systems, termed guests, to run concurrently on a host computer. The hypervisor presents to the guest operating systems a virtual operating platform and manages the execution of the guest operating systems.

A user may group the compute nodes to form a cloud group by any logic the user chooses. For example, the user may create a cloud group for ESX® hypervisors and create another cloud group for z/VM® hypervisors. In another example, a user may create a cloud group for their development organization and create another cloud group to run production workload.

Currently, a user manually assigns the compute nodes to form a cloud group, which requires the user to possess an understanding of the cloud computing environment and its composition. For example, a user may want to select compute nodes that reside in different parts of the cloud computing environment to create a cloud group that provides high availability, such as to ensure a prearranged level of operational performance will be met during a contractual measurement period (e.g., having a backup compute node in case one of the compute nodes fails). However, users may not possess such an understanding of the cloud computing environment and its composition.

As a result, users may not be able to optimally select a group of compute nodes to form a cloud group that meets their desired needs, let alone in an efficient manner.

BRIEF SUMMARY

In one embodiment of the present invention, a method for dynamically building a set of compute nodes to host a user's workload comprises receiving workload definitions comprising types of workloads that are to be run in a cloud group as well as a number of instances of each workload the cloud group should support. The method further comprises using the workload definitions to determine virtual machine demands that the cloud group will place on a cloud computing environment. Additionally, the method comprises receiving demand constraints on the cloud group. Furthermore, the method comprises receiving placement constraints on the cloud group. In addition, the method comprises identifying, by a processor, the set of compute nodes to host the user's workload based on the virtual machine demands, the demand constraints and the placement constraints.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
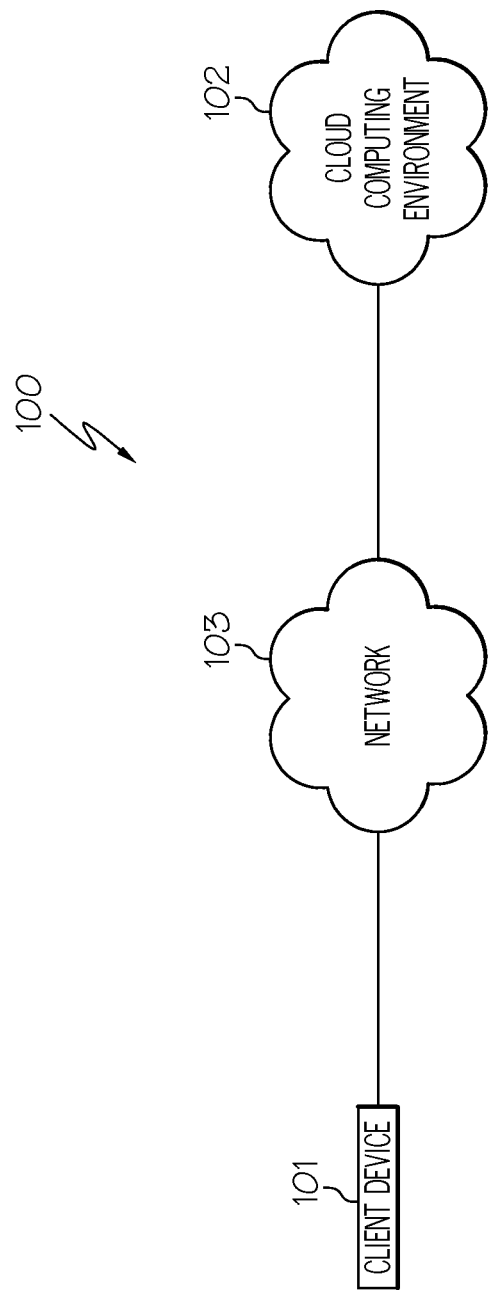
FIG. 1 illustrates a network system configured in accordance with an embodiment of the present invention.

The present invention comprises a method, system and computer program product for dynamically building a set of compute nodes to host a user's workload. In one embodiment of the present invention, an administrative server receives workload definitions that include the types of workloads (e.g., purchase orders, online banking) that are to be run in a cloud group as well as a number of instances of each workload the cloud group should support. These workload definitions may be used to determine the virtual machine demands that the cloud group will place on the cloud computing environment. The administrative server further receives the demand constraints (constraints being applied to the computing resources used to provide the requested services), placement constraints (constraints on the location of instances of the virtual machines) and license enforcement policies (limitations on the usages of the virtual machines via a software license). The administrative server identifies a set of compute nodes to host the user's workload based on the virtual machines demands, the demand constraints, the placement constraints and the license enforcement policies. In this manner, a set of compute nodes is dynamically built for consideration in forming a cloud group without the user requiring knowledge of the cloud's composition.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
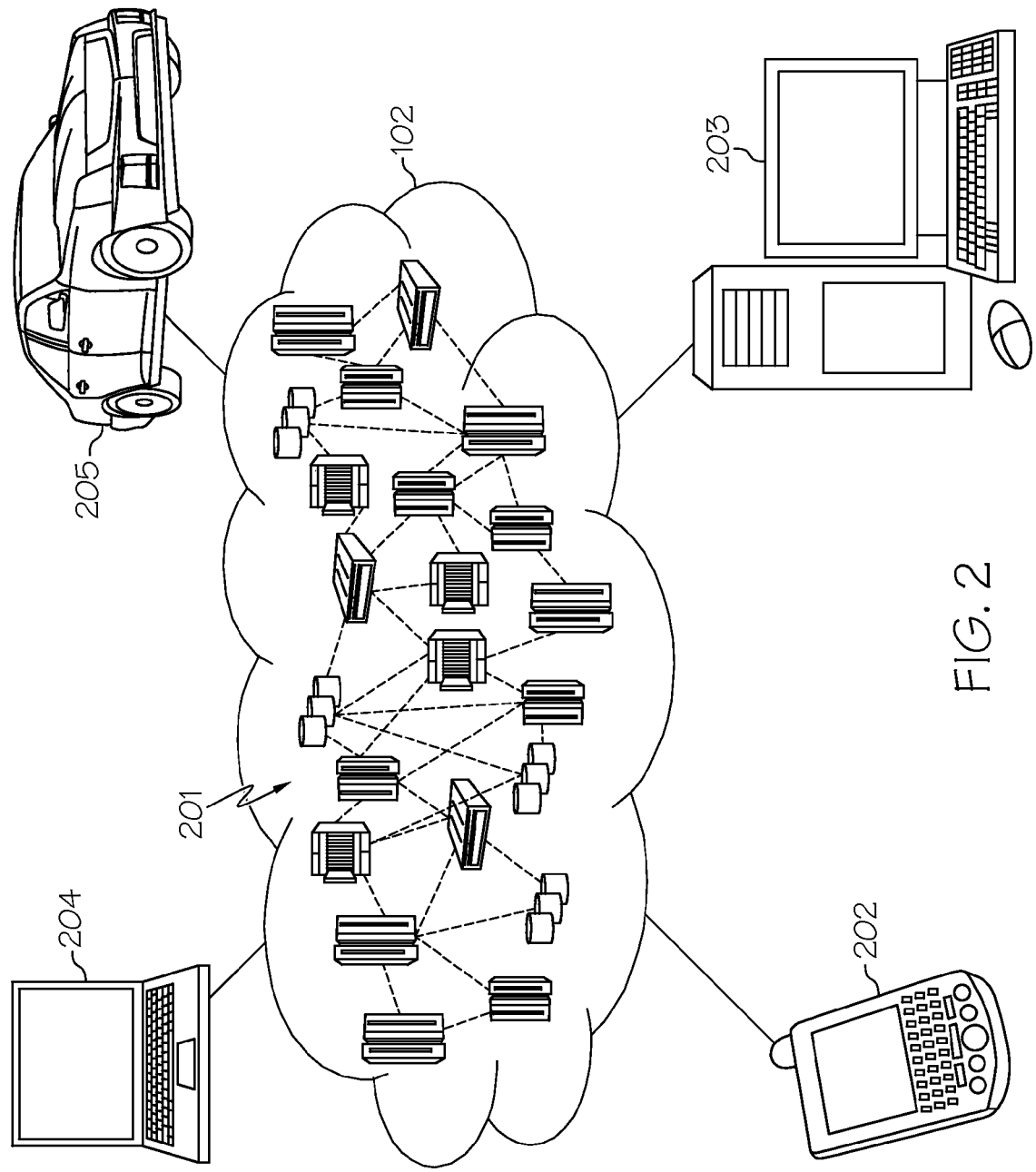
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. Cloud computing nodes 201 may include one or more racks of compute nodes (e.g., servers) that are managed by a server (referred to herein as the "administrative server") in cloud computing environment 102 as discussed below in greater detail in connection with FIG. 3.

It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
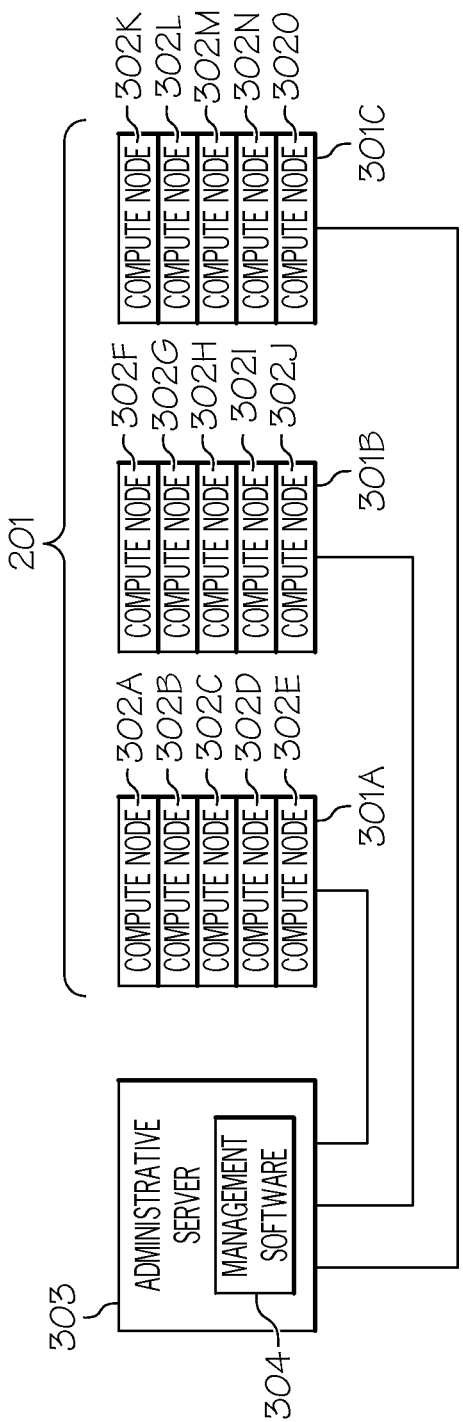
FIG. 3 illustrates a schematic of racks of compute nodes of the cloud computing node(s) that are managed by an administrative server in accordance with an embodiment of the present invention.

Referring now to FIG. 3, FIG. 3 illustrates a schematic of racks of compute nodes (e.g., servers) of cloud computing node(s) 201 that are managed by an administrative server in accordance with an embodiment of the present invention.

As shown, cloud computing node(s) 201 (also may be referred to as a "cluster") may include one or more racks 301A-301C of hardware components or "compute nodes," such as servers or other electronic devices. For example, rack 301A houses compute nodes 302A-302E, rack 301B houses compute nodes 302F-302J and rack 301C houses compute nodes 302K-302O. Racks 301A-301C may collectively be referred to as racks 301 or rack 301, respectively. Furthermore, compute nodes 302A-302O may collectively be referred to as compute nodes 302 or compute node 302, respectively. An illustrative virtualization environment for compute node 302 is discussed further below in connection with FIG. 4. FIG. 3 is not to be limited in scope to the number of racks 301 or compute nodes 302 depicted. For example, cloud computing node 201 may be comprised of any number of racks 301 which may house any number of compute nodes 302. Furthermore, while FIG. 3 illustrates racks 301 housing compute nodes 302, racks 301 may house any type of computing component that is used by cloud computing node 201. Furthermore, while the following discusses compute nodes 302 being confined in designated racks 301, it is noted for clarity that compute nodes 302 may be distributed across cloud computing environment 102 (FIGS. 1 and 2). It is further noted that the set of compute nodes 302 dynamically built to host the user's workload, as discussed further herein, may include compute nodes 302 that are distributed across cloud computing environment 102 in various cloud computing nodes 201.

As further shown in FIG. 3, racks 301 are each coupled to an administrative server 303 configured to provide data center-level functions. Administrative server 303 supports a module, referred to herein as the management software 304, that can be used to manage all the compute nodes 302 of cloud computing nodes 201, monitor system utilization, intelligently deploy images of data and optimize the operations of cloud computing environment 102. Furthermore, management software 304 can be used to dynamically build a set of compute nodes 302 to be considered to form a cloud group as well as to monitor a cloud group and rebalance system resources, if necessary, as discussed further below. A cloud group refers to a group of compute nodes 302 that are used in combination to run user designated workloads. A description of the hardware configuration of administrative server 303 is provided further below in connection with FIG. 5.

Figure 4:
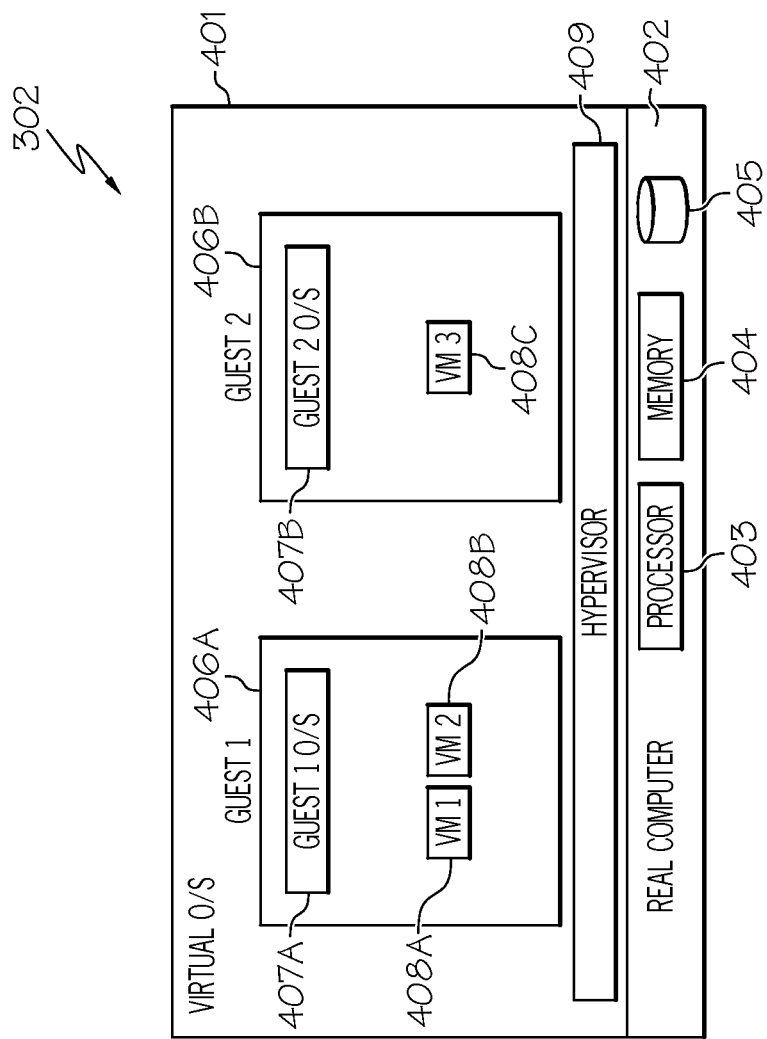
FIG. 4 illustrates a virtualization environment for a compute node in accordance with an embodiment of the present invention.

Referring now to FIG. 4, FIG. 4 illustrates a virtualization environment for compute node 302 (FIG. 3) in accordance with an embodiment of the present invention. Compute node 302 includes a virtual operating system 401. Operating system 401 executes on a real or physical computer 402. Real computer 402 includes one or more processors 403, a memory 404 (also referred to herein as the host physical memory), one or more disk drives 405 and the like. Other components of real computer 402 are not discussed herein for the sake of brevity.

Virtual operating system 401 further includes user portions 406A-406B (identified as "Guest 1 and Guest 2," respectively, in FIG. 4), referred to herein as "guests." Each guest 406A, 406B is capable of functioning as a separate system. That is, each guest 406A-406B can be independently reset, host a guest operating system 407A-407B, respectively, (identified as "Guest 1 O/S" and "Guest 2 O/S," respectively, in FIG. 4) and operate with different programs. An operating system or application program running in guest 406A, 406B appears to have access to a full and complete system, but in reality, only a portion of it is available. Guests 406A-406B may collectively or individually be referred to as guests 406 or guest 406, respectively. Guest operating systems 407A-407B may collectively or individually be referred to as guest operating systems 407 or guest operating system 407, respectively.

Each guest operating system 407A, 407B may host one or more virtual machine applications 408A-408C (identified as "VM 1," "VM 2" and "VM 3," respectively, in FIG. 4), such as Java™ virtual machines. For example, guest operating system 407A hosts virtual machine applications 408A-408B. Guest operating system 407B hosts virtual machine application 408C. Virtual machines 408A-408C may collectively or individually be referred to as virtual machines 408 or virtual machine 408, respectively.

Virtual operating system 401 further includes a common base portion 409, referred to herein as a hypervisor. Hypervisor 409 may be implemented in microcode running on processor 403 or it may be implemented in software as part of virtual operating system 401. Hypervisor 409 is configured to manage and enable guests 406 to run on a single host.

As discussed above, virtual operating system 401 and its components execute on physical or real computer 402. These software components may be loaded into memory 404 for execution by processor 403.

The virtualization environment for compute node 302 is not to be limited in scope to the elements depicted in FIG. 4. The virtualization environment for compute node 302 may include other components that were not discussed herein for the sake of brevity.

Figure 5:
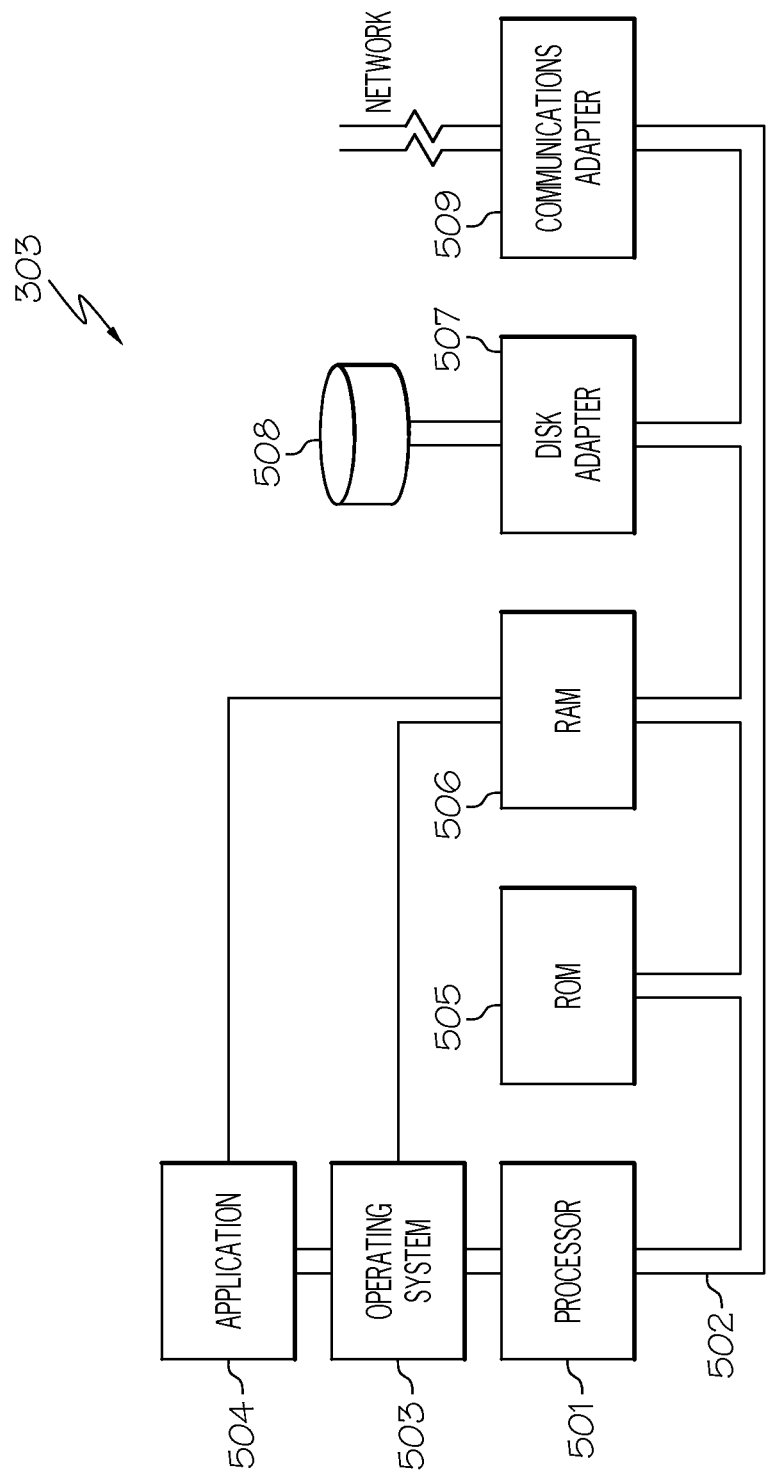
FIG. 5 illustrates a hardware configuration of an administrative server configured in accordance with an embodiment of the present invention.

Referring now to FIG. 5, FIG. 5 illustrates a hardware configuration of administrative server 303 (FIG. 3) which is representative of a hardware environment for practicing the present invention. Administrative server 303 has a processor 501 coupled to various other components by system bus 502. An operating system 503 runs on processor 501 and provides control and coordinates the functions of the various components of FIG. 5. An application 504 in accordance with the principles of the present invention runs in conjunction with operating system 503 and provides calls to operating system 503 where the calls implement the various functions or services to be performed by application 504. Application 504 may include, for example, a program for dynamically building a set of compute nodes 302 (FIG. 3) to host the user's workload as well as monitoring a cloud group and rebalancing system resources, if necessary, as discussed further below in association with FIGS. 6 and 7A-7B.

Referring again to FIG. 5, read-only memory ("ROM") 505 is coupled to system bus 502 and includes a basic input/output system ("BIOS") that controls certain basic functions of administrative server 303. Random access memory ("RAM") 506 and disk adapter 507 are also coupled to system bus 502. It should be noted that software components including operating system 503 and application 504 may be loaded into RAM 506, which may be administrative server's 303 main memory for execution. Disk adapter 507 may be an integrated drive electronics ("IDE") adapter that communicates with a disk unit 508, e.g., disk drive. It is noted that the program for dynamically building a set of compute nodes 302 (FIG. 3) to host the user's workload as well as monitoring a cloud group and rebalancing system resources, if necessary, as discussed further below in association with FIGS. 6 and 7A-7B, may reside in disk unit 508 or in application 504.

Administrative server 303 may further include a communications adapter 509 coupled to bus 502. Communications adapter 509 interconnects bus 502 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, a user manually assigns the compute nodes to form a cloud group, which requires the user to possess an understanding of the cloud computing environment and its composition. For example, a user may want to select compute nodes that reside in different parts of the cloud computing environment to create a cloud group that provides high availability, such as to ensure a prearranged level of operational performance will be met during a contractual measurement period (e.g., having a backup compute node in case one of the compute nodes fails). However, users may not possess such an understanding of the cloud computing environment and its composition. As a result, users may not be able to optimally select a group of compute nodes to form a cloud group that meets their desired needs, let alone in an efficient manner.

Figure 6:
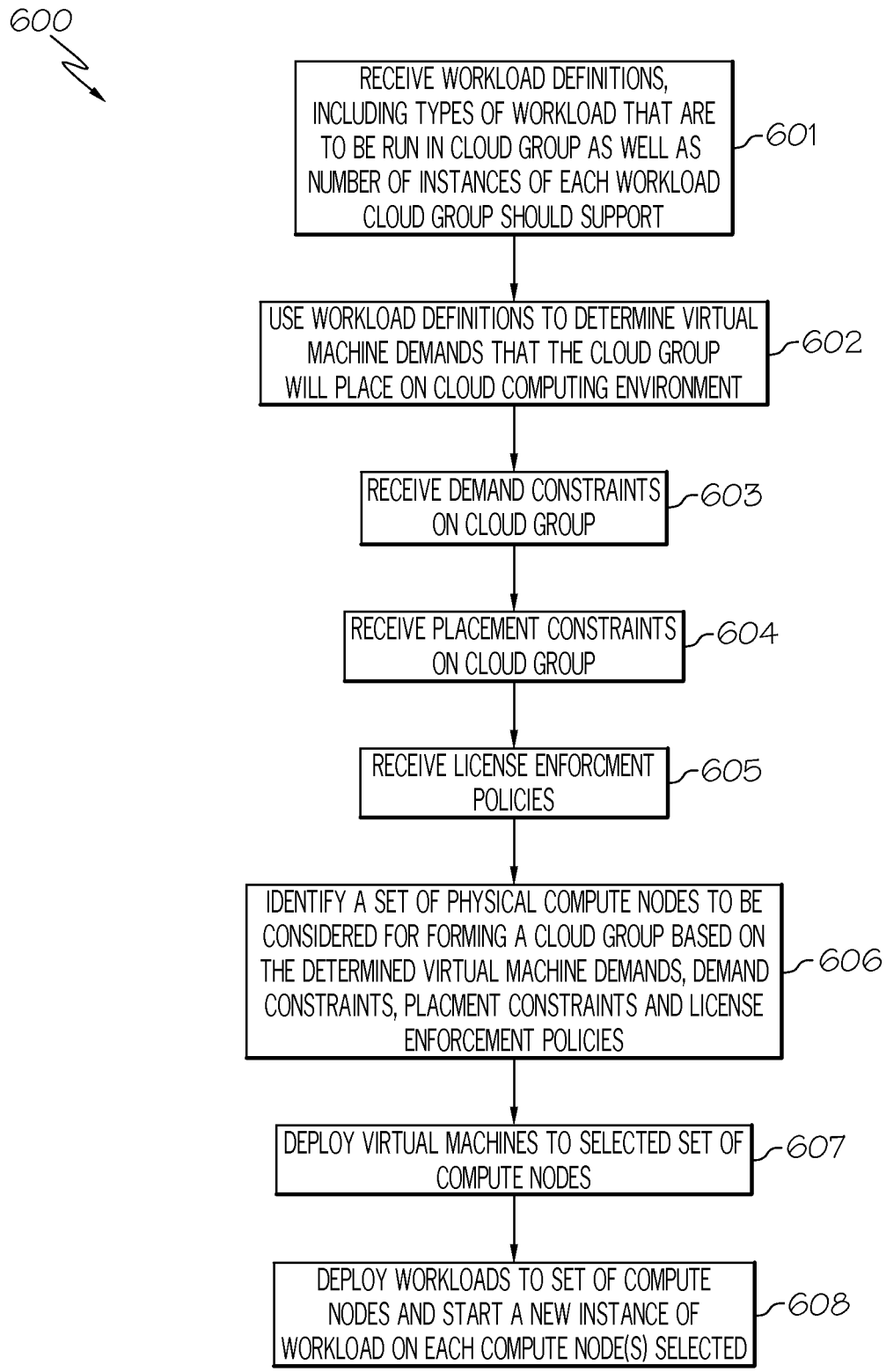
FIG. 6 is a flowchart of a method for dynamically building a set of compute nodes to host the user's workload in accordance with an embodiment of the present invention.
Figure 7A:
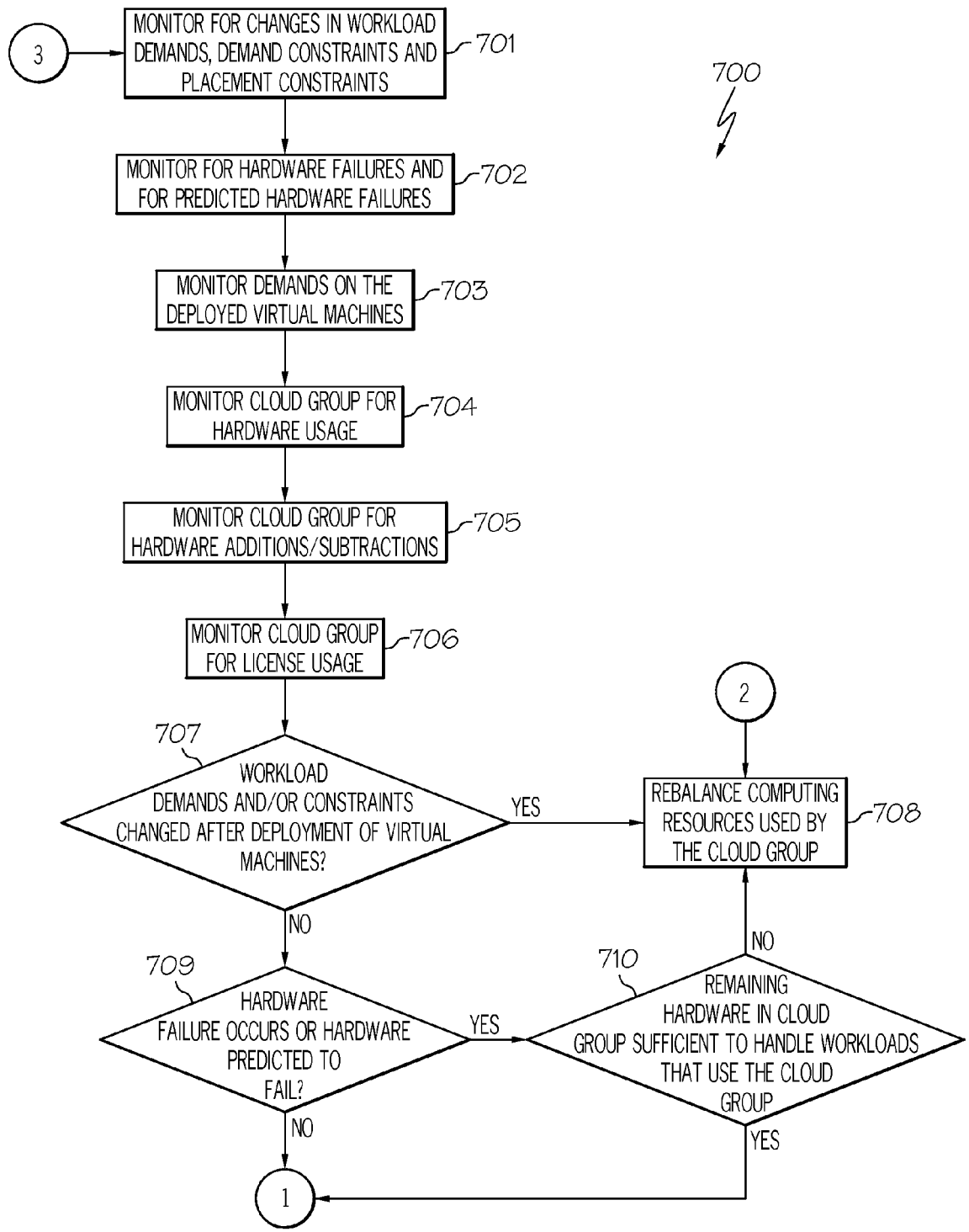
FIGS. 7A-7B are a flowchart of a method for monitoring the cloud group and potentially rebalancing the computing resources, if needed, in accordance with an embodiment of the present invention.
Figure 7B:
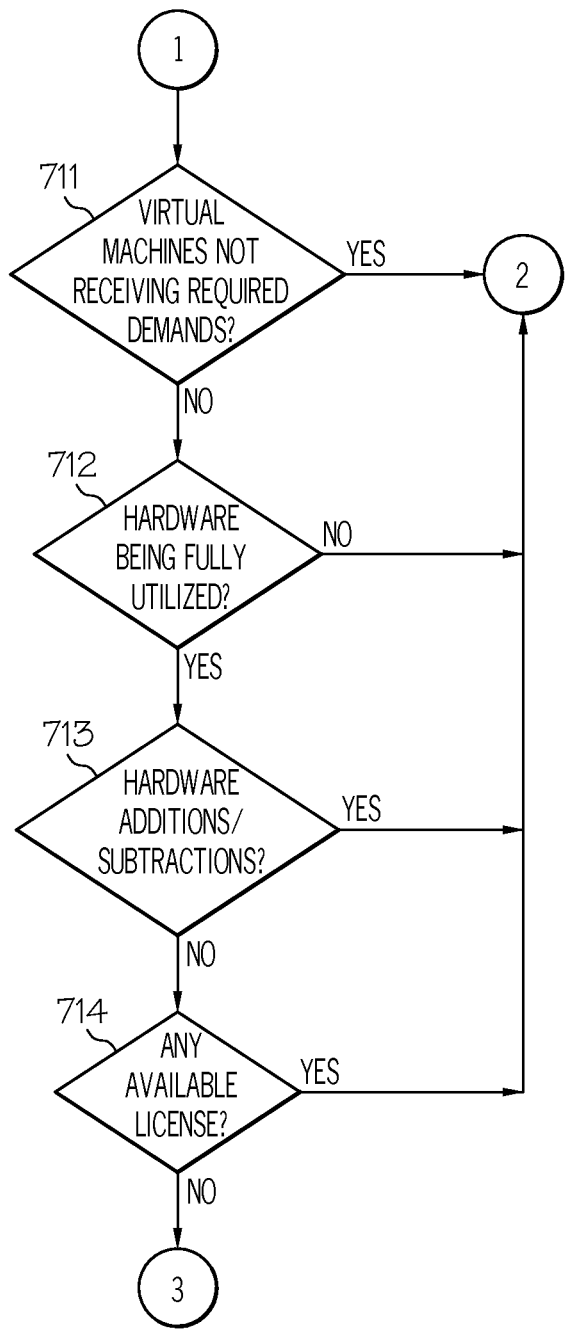

The principles of the present invention provide a means for dynamically building a set of compute nodes to host the user's workload based on the user's workload requirements, the demand and placement constraints as well as the license enforcement policies without the user requiring knowledge of the cloud's composition as discussed further below in connection FIG. 6. FIG. 6 is a flowchart of a method for dynamically building a set of compute nodes to host the user's workload. After dynamically building the set of compute nodes to host the user's workload, administrative server 303 (FIGS. 3 and 5) monitors the cloud group and can rebalance the computing resources accordingly, if necessary, as discussed further below in connection with FIGS. 7A-7B. FIGS. 7A-7B are a flowchart of a method for monitoring the cloud group and potentially rebalancing the computing resources, if needed.

Referring to FIG. 6, FIG. 6 is a flowchart of a method 600 for dynamically building a set of compute nodes 302 (FIGS. 3 and 4) to host the user's workload in accordance with an embodiment of the present invention.

Referring to FIG. 6, in conjunction with FIGS. 1-5, in step 601, administrative server 303 receives workload definitions from the user, which may include the types of workloads (e.g., purchase orders, online banking, serving web pages) that are to be run in the newly created cloud group as well as the number of instances of each workload the cloud group should support.

In step 602, administrative server 303 uses the received workload definitions to determine virtual machine demands (e.g., number of Central Processing Units (CPUs), memory required, ingress/egress bandwidth required for data and storage networks) that the cloud group will place on cloud computing environment 102.

In step 603, administrative server 303 receives the demand constraints on the cloud group to be created. Demand constraints refer to user specified constraints being applied to computing resources used to provide the requested services. For example, demand constraints may include processor, memory, storage, network I/O, storage I/O and bandwidth constraints that each virtual machine 408 of the virtual machines 408 deployed in the cloud group requires.

In step 604, administrative server 303 receives the placement constraints on the cloud group to be created. Placement constraints refer to user specified constraints on the location of instances of virtual machines 408. For instance, placement constraints may include deployment policies, such as high availability and energy conservation. High availability refers to ensuring a prearranged level of operational performance will be met during a contractual measurement period (e.g., having a backup compute node 302 in case one of the compute nodes 302 fails). As a result, a high availability policy may spread the workloads across compute nodes 302. An energy conservation policy, on the other hand, may attempt to place the workloads on the same physical compute node 302 so as to conserve energy use. Placement constraints may further include consolidation. In another example of placement constraints, a user may specify a constraint that a particular cloud group needs physical separation of their workloads. As a result, administrative server 303 would ensure that workloads for that cloud group are only placed on compute nodes 302 on which no workloads from other cloud groups would run.

In step 605, administrative server 303 receives license enforcement policies. A license enforcement policy refers to limitations on the usages of virtual machines 408 via a software license, such as in a service-level agreement. For example, due to license enforcement policies, it may be preferable to place a virtual machine 408 on a compute node 302 that has a higher usage than another compute node 302. In another example, due to the way licenses are counted, it may be possible to run additional instances of a virtual machine 408 on compute node 302 without additional license charges, where the licenses are counted based on the number of compute nodes 302 and not on the number of virtual machines 408 running on compute nodes 302.

In step 606, administrative server 303 identifies a set of compute nodes 302 to be considered for forming a cloud group based on the determined virtual machine demands, demand constraints, placement constraints and license enforcement policies discussed above while being able to host the user's workload. That is, administrative server 303 dynamically builds a set of compute nodes 302 to be considered for forming a cloud group that satisfies a "pattern." A pattern may refer to the user's workload requirements, demand constraints, placement constraints and license enforcement policies.

In step 607, administrative server 303 deploys virtual machines 408 to the identified set of compute nodes 302 in connection with meeting the determined virtual machine demands, demand constraints, placement constraints and license enforcement policies while being able to host the user's workload.

In step 608, administrative server 303 deploys the workloads to the identified set of compute nodes 302 and starts a new instance of the workload on each appropriate compute node 302 in the identified set of compute nodes 302.

In this manner, a set of compute nodes 302 is dynamically built for consideration in forming a cloud group without the user requiring knowledge of the cloud's composition.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

After dynamically building the set of compute nodes 302 for hosting the user's workload, administrative server 303 monitors the cloud group to determine if the computing resources (e.g., virtual machines 408) need to be rebalanced as discussed further below in connection with FIGS. 7A-7B.

FIGS. 7A-7B are a flowchart of a method 700 for monitoring the cloud group and rebalancing the computing resources, if necessary, after the deployment of virtual machines 408 to the set of compute nodes 302 in accordance with an embodiment of the present invention.

Referring to FIG. 7A, in conjunction with FIGS. 1-5, in step 701, administrative server 303 monitors for changes in the workload demands as well as for changes in the demand constraints and placement constraints after the deployment of virtual machines 408.

In step 702, administrative server 303 monitors for hardware failures and for predicted hardware failures. For example, administrative server 303 may treat a large number of retransmits or bad packets sent over a network port as indicating a problem with that network connection. In another example, administrative server 303 may treat the failure of more than one dual in-line memory module as indicating that additional dual in-line memory modules are likely to fail. In one embodiment, administrative server 303 treats the "predicted" failure as though it has already occurred (i.e., administrative server 303 treats a detected failure the same as a predicted failure).

In step 703, administrative server 303 monitors demands on the deployed virtual machines 408. For example, administrative server 303 monitors the set of compute nodes 302 to ensure that all virtual machines 408 deployed in the set of compute nodes 302 are receiving their required demands (e.g., meeting processor, memory, storage, network I/O and storage I/O requirements).

In step 704, administrative server 303 monitors the cloud group for hardware usage. For example, if multiple servers are not being fully utilized, then it may be desirable to remove those servers from the cloud group.

In step 705, administrative server 303 monitors the cloud group for hardware (e.g., servers, switches) additions/subtractions. For example, a new server may be added to the cloud group.

In step 706, administrative server 303 monitors the cloud group for license usage.

In step 707, a determination is made by administrative server 303 as to whether workload demands and/or demand constraints and/or placement constraints have changed after the deployment of virtual machines 408.

If there has been a change in the workload demands and/or demand constraints and/or placement constraints, then, in step 708, administrative server 303 rebalances the computing resources used by the cloud group accordingly. Rebalancing may refer to relocating one or more of virtual machines 408 to other compute nodes 302 of the cloud group. Such relocating may include what is referred to herein as "chained relocations," which involve other required relocations in order to relocate a single virtual machine 408. For example, in order to move virtual machine 408A on compute node 302A to compute node 302B, virtual machine 408B on compute node 302A may need to be moved to compute node 302C. Rebalancing may also refer to adding one or more virtual machines 408 to the set of computing nodes 302. Additionally, rebalancing may refer to relocating one or more virtual machines 408 in the cloud group to other computing nodes 302 outside of the cloud group. "Rebalancing," as used herein, refers to any of the examples listed above, including a combination of them, in order to rebalance the computing resources so as to meet the required workload demands and constraints.

If, however, there has not been a change in the workload demands and/or demand constraints and/or placement constraints, then, in step 709, administrative server 303 determines whether it detected any hardware failures or detected any predicted hardware failures. If administrative server 303 detected any hardware failures or detected any predicted hardware failures, then, in step 710, administrative server 303 determines if the remaining hardware (e.g., computing nodes 302) in the cloud group are sufficient to handle the workloads that use the cloud group.

If the remaining hardware in the cloud group is not sufficient to handle the workloads that use the cloud group, then, in step 708, administrative server 303 rebalances the computing resources used by the cloud group accordingly.

Referring to FIG. 7B, in conjunction with FIGS. 1-5, if, however, administrative server 303 did not detect a hardware failure or detect a predicted hardware failure, or if the remaining hardware in the cloud group is sufficient to handle the workloads that use the cloud group, then, in step 711, administrative server 303 determines if virtual machines 408 in the deployed virtual machines 408 are not receiving their required demands. If virtual machines 408 in the deployed virtual machines 408 are not receiving their required demands, then, in step 708, administrative server 303 rebalances the computing resources used by the cloud group accordingly.

If, however, virtual machines 408 in the deployed virtual machines 408 are receiving their required demands, then, in step 712, administrative server 303 determines if computing resources used by the cloud group need to be rebalanced because the hardware is not being fully utilized. If the hardware is not being fully utilized, then, in step 708, administrative server 303 rebalances the computing resources used by the cloud group accordingly.

If, however, hardware is being fully utilized, then, in step 713, administrative server 303 determines if there were any hardware (e.g., switches, servers) additions/subtractions in the cloud group. If there were hardware additions/subtractions in the cloud group, then, in step 708, administrative server 303 rebalances the computing resources used by the cloud group accordingly.

If, however, there were no hardware additions/subtractions in the cloud group, then, in step 714, administrative server 303 determines if there are any available licenses due to a virtual machine 408 that was previously consuming a license (i.e., previously counted as using a license) no longer having a need to consume the license. If there are available licenses, then, in step 708, administrative server 303 rebalances the computing resources used by the cloud group accordingly.

If, however, there are no available licenses, then administrative server 303 continues to monitor for changes in the workload demands as well as for changes in the demand constraints and placement constraints after the deployment of virtual machines 408 in step 701.

In some implementations, method 700 may include other and/or additional steps that, for clarity, are not depicted. Further, in some implementations, method 700 may be executed in a different order presented and that the order presented in the discussion of FIGS. 7A-7B is illustrative. Additionally, in some implementations, certain steps in method 700 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for dynamically building a set of compute nodes to host a user's workload, the method comprising:
   receiving workload definitions comprising types of workloads that are to be run in a cloud group as well as a number of instances of each workload said cloud group should support;
   using said workload definitions to determine virtual machine demands that said cloud group will place on a cloud computing environment;
   receiving demand constraints on said cloud group;
   receiving placement constraints on said cloud group; and
   identifying, by a processor, said set of compute nodes to host said user's workload based on said virtual machine demands, said demand constraints and said placement constraints.

2. The method as recited in claim 1, wherein said demand constraints on said cloud group comprise one or more of the following: processor, memory, storage, network I/O, storage I/O and bandwidth constraints.

3. The method as recited in claim 1, wherein said placement constraints on said cloud group comprise one or more of the following: high availability, consolidation and energy conservation constraints.

4. The method as recited in claim 1 further comprising:
   receiving license enforcement policies; and
   identifying said set of compute nodes to host said user's workload based on said virtual machine demands, said demand constraints, said placement constraints and said license enforcement policies.

5. The method as recited in claim 1 further comprising:
   deploying virtual machines to said set of compute nodes; and
   deploying workloads to said set of compute nodes.

6. The method as recited in claim 5 further comprising one or more of the following:
   monitoring for changes in workload demands, said demand constraints and said placement constraints after said deployment of said virtual machines;
   monitoring for hardware failures and for predicted hardware failures after said deployment of said virtual machines;
   monitoring demands on said virtual machines after said deployment of said virtual machines;
   monitoring for hardware usage after said deployment of said virtual machines;
   monitoring for additions or subtractions of hardware in said cloud group after said deployment of said virtual machines; and
   monitoring for license usage after said deployment of said virtual machines.

7. The method as recited in claim 6 further comprising one or more of the following:
   rebalancing computing resources in said cloud group in response to one or more of said workload demands, said demand constraints and said placement constraints changing after said deployment of said virtual machines;
   said rebalancing of said computing resources in said cloud group in response to detecting said hardware failure or said predicted hardware failure;
   said rebalancing of said computing resources in said cloud group in response to one or more virtual machines of said deployed virtual machines not receiving required demands;
   said rebalancing of said computing resources in said cloud group in response to hardware not being fully utilized;
   said rebalancing of said computing resources in said cloud group in response to said additions or subtractions of hardware in said cloud group; and
   said rebalancing of said computing resources in said cloud group in response to a license being available.

8. The method as recited in claim 7, wherein said rebalancing of said computing resources comprises one or more of the following:
   relocating one or more virtual machines in said deployed virtual machines, wherein said relocating comprises chained relocations;
   adding one or more virtual machines to said deployed virtual machines in said set of compute nodes; and
   relocating one or more virtual machines in said deployed virtual machines in said set of compute nodes of said cloud group to other compute nodes outside of said cloud group.

* * * * *